US012154402B2

(12) United States Patent
Ouellette et al.

(10) Patent No.: US 12,154,402 B2
(45) Date of Patent: Nov. 26, 2024

(54) VOICE BASED ACCESS CONTROL WITH INCREASED ASSURANCE

(71) Applicant: TYCO FIRE & SECURITY GMBH, Schaffhausen (CH)

(72) Inventors: Jason M. Ouellette, Sterling, MA (US); Gopal Paripally, North Andover, MA (US); Glenn Holton, Braintree, MA (US); Brian Edward Rich, Nashua, NH (US); David Monahan, Donaghadee (GB); Khaled Saad, La Prairie (CA)

(73) Assignee: TYCO FIRE & SECURITY GMBH, Schaffhausen (CH)

( * ) Notice: Subject to any disclaimer, the term of this patent is extended or adjusted under 35 U.S.C. 154(b) by 0 days.

(21) Appl. No.: 17/992,551

(22) Filed: Nov. 22, 2022

(65) Prior Publication Data

US 2024/0169778 A1    May 23, 2024

(51) Int. Cl.
*G07C 9/25* (2020.01)
*G07C 9/28* (2020.01)
*G10L 17/00* (2013.01)

(52) U.S. Cl.
CPC ............... *G07C 9/25* (2020.01); *G07C 9/28* (2020.01); *G10L 17/00* (2013.01)

(58) Field of Classification Search
None
See application file for complete search history.

(56) References Cited

U.S. PATENT DOCUMENTS

| 10,332,069 | B2* | 6/2019 | Stiefel | G06Q 10/087 |
| 11,704,431 | B2* | 7/2023 | Kraus | H04L 63/0414 |
| | | | | 726/26 |
| 11,888,870 | B2* | 1/2024 | Garyani | H04L 63/1425 |
| 2010/0306249 | A1* | 12/2010 | Hill | G06F 16/9535 |
| | | | | 707/769 |

(Continued)

FOREIGN PATENT DOCUMENTS

WO    2019000077 A1    1/2019

OTHER PUBLICATIONS

International Search Report and Written Opinion issued in International Patent Application No. PCT/US2023/080372 on Mar. 20, 2024.

*Primary Examiner* — Fekadeselassie Girma
(74) *Attorney, Agent, or Firm* — ArentFox Schiff LLP

(57) ABSTRACT

A method of access control includes receiving an access request transaction from one of a first identity sensor. Current confidence information is determined for the access request transaction. Prior confidence information is determined for at least one prior access request transaction associated with the user from at least one second identity sensor. A total confidence score value is generated based on a confidence function applied to the current confidence information and the prior confidence information. The total confidence score value is compared with a confidence threshold value for the secure resource associated with the access request transaction. Access to the secure resource is granted, in response to determining that the total confidence score value meets the confidence threshold value. The access to the secure resource is denied, in response to determining that the total confidence score value does not meet the confidence threshold value.

25 Claims, 7 Drawing Sheets

(56) References Cited

U.S. PATENT DOCUMENTS

| | | | |
|---|---|---|---|
| 2011/0250903 A1* | 10/2011 | Huang | H04W 24/00 |
| | | | 455/456.1 |
| 2012/0130762 A1* | 5/2012 | Gale | G06V 20/20 |
| | | | 714/49 |
| 2015/0089568 A1* | 3/2015 | Sprague | H04L 63/0853 |
| | | | 726/1 |
| 2015/0347734 A1 | 12/2015 | Beigi | |
| 2019/0082385 A1* | 3/2019 | Shellhammer | H04L 47/25 |
| 2020/0162516 A1* | 5/2020 | Israel | G06F 21/566 |
| 2020/0201856 A1* | 6/2020 | Israel | G06F 16/2455 |
| 2020/0244640 A1* | 7/2020 | Itzhaki | G06F 21/31 |
| 2020/0304524 A1* | 9/2020 | Weinberger | H04L 63/1425 |
| 2020/0322359 A1* | 10/2020 | Burns | H04L 63/1416 |
| 2020/0336505 A1* | 10/2020 | Neuvirth | H04L 63/1433 |
| 2021/0051624 A1* | 2/2021 | Koshy | H04W 24/10 |
| 2022/0086179 A1* | 3/2022 | Levin | H04W 12/63 |
| 2022/0284749 A1 | 9/2022 | Adam | |

* cited by examiner

| Current Time: | 6/15/2022 8:21 | | | | | | | | | | | | | |
|---|---|---|---|---|---|---|---|---|---|---|---|---|---|---|
| IT | VR | BS 1 | BS 2 | FR 1 | FR 2 | PNA 1 | PNA 2 | IG 1 (10 members) | G2 (1 member) | CR 1 | CR 2 | TCS | DCR | DCD | LD | CD |
| John Doe | | | | | | | | | | | | | | |
| Date/Time | 6/15/2022 8:21 | 6/15/22 8:21 | 6/15/22 8:13 N/A | 6/15/2022 7:35 N/A | | 6/15/2022 7:18 N/A | | 6/15/2022 8:11 N/A | | | | | | |
| Identity | | 82 | 0 | 0 | 82 | 0 | 90 | 0 | 10 | 0 | 0 | | | |
| Location | | 100 | 100 | 100 | 100 | 100 | 100 | 100 | 100 | 0 | 0 | | | |
| Weighting | | 0 | 8 | 0 | 46 | 0 | 0 | 0 | 10 | 0 | 0 | | | |
| Score | | 91 | 42 | 0 | 45 | 0 | 95 | 0 | 46 | 0 | 0 | 64 | Access Denied | Access Granted | Access Granted | |
| Jane Doe | | | | | | | | | | | | | | |
| Date/Time | 6/15/2022 8:21 | 6/15/22 8:13 | 6/15/2022 7:12 | 6/15/2022 7:35 | 6/15/2022 8:02 | 6/15/2022 7:18 | 6/15/2022 6:51 | 6/15/2022 7:01 | 6/15/2022 8:20 | 6/15/2022 8:20 | 6/15/2022 8:20 | | | |
| Identity | | 62 | 0 | 0 | 82 | 72 | 90 | 90 | 10 | 100 | 100 | | | |
| Location | | 100 | 100 | 100 | 100 | 100 | 100 | 50 | 100 | 100 | 100 | | | |
| Weighting | | 0 | 8 | 50 | 46 | 19 | 0 | 0 | 9 | 0 | 1 | | | |
| Score | | 81 | 42 | 50 | 45 | 67 | 95 | 70 | 46 | 100 | 99 | 72 | Access Granted | Access Granted | Access Granted | |

600

Fig. 6

VOICE BASED ACCESS CONTROL WITH INCREASED ASSURANCE

FIELD

The present disclosure relates generally to access control systems. More particularly, the present disclosure relates to voice based access control with increased assurance.

BACKGROUND

Security systems are often installed within and around buildings such as commercial, residential, or governmental buildings. Examples of these buildings include offices, hospitals, warehouses, schools or universities, shopping malls, government offices, and casinos. The security systems typically include components such as system controllers, access control readers, video surveillance cameras, network video recorders (NVRs), and door controllers, to list a few examples.

The access control readers are often installed at access points of the buildings to control access to restricted areas, such as buildings or areas of the buildings. Examples of access points include front and interior doors of a building, elevators, hallways connecting two areas of a building, to list a few examples. The access control readers authenticate identities of (or authorize) individuals and then permit those authenticated individuals to access the restricted areas through the access points. Typically, individuals interact with the access control readers by swiping keycards (badges) or bringing contactless smart cards within range (approximately 2-3 inches or 5 centimeters) of a reader. The access control readers read the information of the keycards and then the access control systems determine if the individuals are authorized to access the restricted areas. If the individuals are authorized to enter the restricted areas, then the access control readers allow access to the restricted areas by unlocking locked doors, signaling that doors should be unlocked, or generating alarms upon unauthorized entry, for example.

Such conventional methods and systems have generally been considered satisfactory for their intended purpose. However, there is still a need in the art to improve the reliability of the accuracy of increased assurance access control.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of access control, comprising receiving an access request transaction from one of a first identity sensor, wherein the access request transaction requests access to a secure resource for a user and includes access request information associated with the user. The method further includes determining current confidence information for the access request transaction, wherein the current confidence information includes a first identity confidence factor value that indicates a level of confidence in a user identity of the user and a first location confidence factor value that indicates a level of confidence in a current location of the user. Additionally, the method further includes determining prior confidence information for at least one prior access request transaction associated with the user from at least one second identity sensor, wherein the prior confidence information includes, for each prior access request transaction, a second identity confidence factor value that indicates the level of confidence of the user identity of the user and a second location confidence factor value that indicates the level of confidence of the location of the user. Additionally, the method further includes generating a total confidence score value based on a confidence function applied to the current confidence information and the prior confidence information. Additionally, the method further includes comparing the total confidence score value with a confidence threshold value for the secure resource associated with the access request transaction. Additionally, the method further includes granting access to the secure resource in response to determining that the total confidence score value meets the confidence threshold value. Additionally, the method further includes denying the access to the secure resource in response to determining that the total confidence score value does not meet the confidence threshold value.

Another example aspect includes an apparatus for access control, comprising a memory and a processor coupled with the memory. The processor is configured to receive an access request transaction from one of a first identity sensor, wherein the access request transaction requests access to a secure resource for a user and includes access request information associated with the user. The processor is further configured to determine current confidence information for the access request transaction, wherein the current confidence information includes a first identity confidence factor value that indicates a level of confidence in a user identity of the user and a first location confidence factor value that indicates a level of confidence in a current location of the user. Additionally, the processor further configured to determine prior confidence information for at least one prior access request transaction associated with the user from at least one second identity sensor, wherein the prior confidence information includes, for each prior access request transaction, a second identity confidence factor value that indicates the level of confidence of the user identity of the user and a second location confidence factor value that indicates the level of confidence of the location of the user. Additionally, the processor further configured to generate a total confidence score value based on a confidence function applied to the current confidence information and the prior confidence information. Additionally, the processor further configured to compare the total confidence score value with a confidence threshold value for the secure resource associated with the access request transaction. Additionally, the processor further configured to grant access to the secure resource in response to determining that the total confidence score value meets the confidence threshold value. Additionally, the processor further configured to deny the access to the secure resource in response to determining that the total confidence score value does not meet the confidence threshold value.

Another example aspect includes an apparatus for access control, comprising means for receiving an access request transaction from one of a first identity sensor, wherein the access request transaction requests access to a secure resource for a user and includes access request information associated with the user. The apparatus further includes means for determining current confidence information for the access request transaction, wherein the current confidence information includes a first identity confidence factor value that indicates a level of confidence in a user identity of the user and a first location confidence factor value that indicates a level of confidence in a current location of the user. Additionally, the apparatus further includes means for determining prior confidence information for at least one prior access request transaction associated with the user from at least one second identity sensor, wherein the prior confidence information includes, for each prior access request transaction, a second identity confidence factor value that indicates the level of confidence of the user identity of the user and a second location confidence factor value that indicates the level of confidence of the location of the user. Additionally, the apparatus further includes means for generating a total confidence score value based on a confidence function applied to the current confidence information and the prior confidence information. Additionally, the apparatus further includes means for comparing the total confidence score value with a confidence threshold value for the secure resource associated with the access request transaction. Additionally, the apparatus further includes means for granting access to the secure resource in response to determining that the total confidence score value meets the confidence threshold value. Additionally, the apparatus further includes means for denying the access to the secure resource in response to determining that the total confidence score value does not meet the confidence threshold value.

Another example aspect includes a computer-readable medium having instructions stored thereon for access control, wherein the instructions are executable by a processor to receive an access request transaction from one of a first identity sensor, wherein the access request transaction requests access to a secure resource for a user and includes access request information associated with the user. The instructions are further executable to determine current confidence information for the access request transaction, wherein the current confidence information includes a first identity confidence factor value that indicates a level of confidence in a user identity of the user and a first location confidence factor value that indicates a level of confidence in a current location of the user. Additionally, the instructions are further executable to determine prior confidence information for at least one prior access request transaction associated with the user from at least one second identity sensor, wherein the prior confidence information includes, for each prior access request transaction, a second identity confidence factor value that indicates the level of confidence of the user identity of the user and a second location confidence factor value that indicates the level of confidence of the location of the user. Additionally, the instructions are further executable to generate a total confidence score value based on a confidence function applied to the current confidence information and the prior confidence information. Additionally, the instructions are further executable to compare the total confidence score value with a confidence threshold value for the secure resource associated with the access request transaction. Additionally, the instructions are further executable to grant access to the secure resource in response to determining that the total confidence score value meets the confidence threshold value. Additionally, the instructions are further executable to deny the access to the secure resource in response to determining that the total confidence score value does not meet the confidence threshold value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines may indicate optional elements, and in which:

FIG. 6 is a table illustrating an example of calculation of the confidence score using the method of FIG. 3.

DETAILED DESCRIPTION

Figure 1:
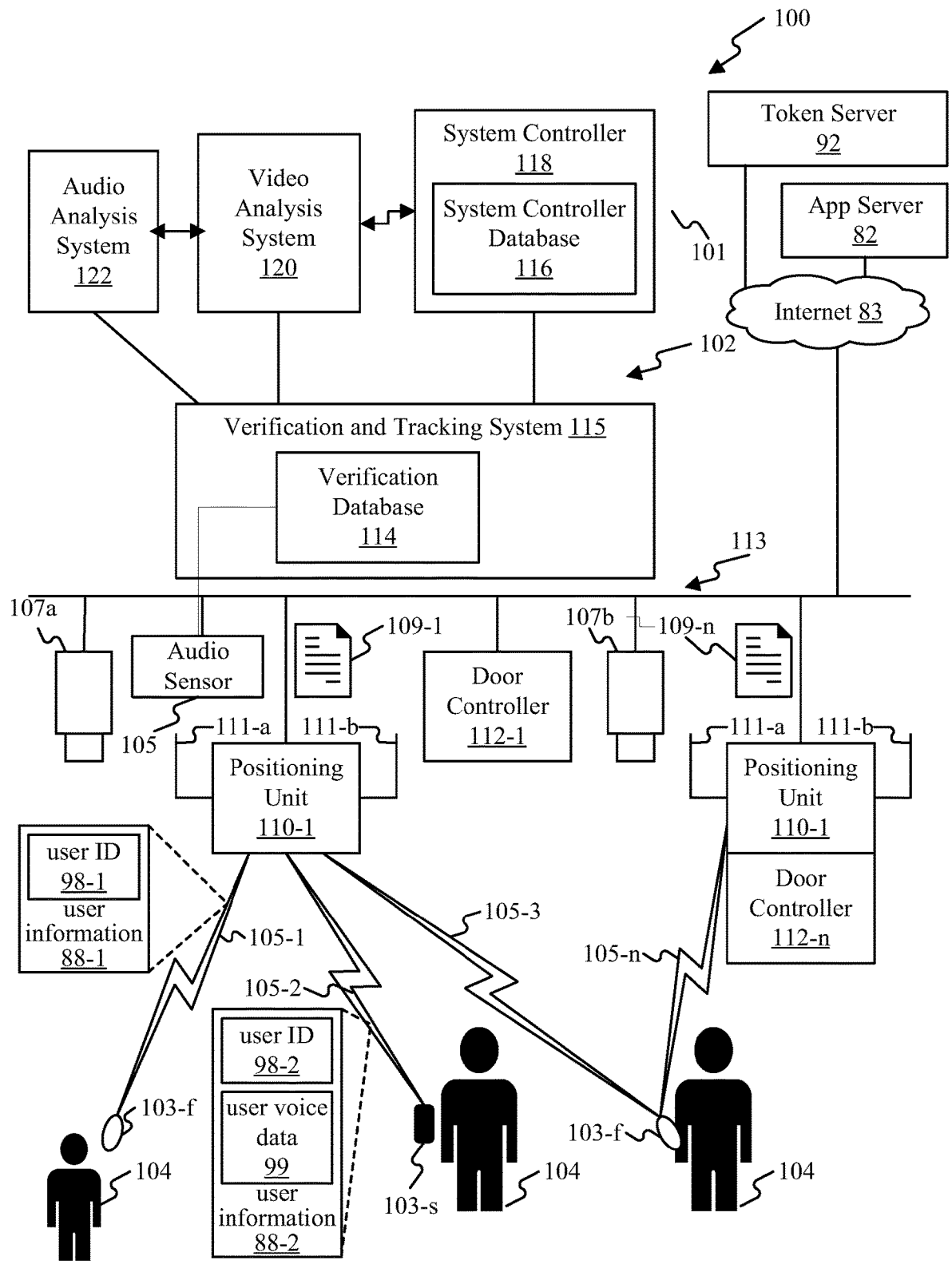
FIG. 1 is a schematic diagram of an example security system that identifies users, tracks locations of active wireless devices, and controls access to different and/or restricted areas, in accordance with aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

For example, in one implementation, which should not be construed as limiting, a security system with voice access sensor fusion functionality tracks each identity sensor transaction (e.g., card access, intrusion arm/disarm, facial recognition, physical network access, etc.), which are time stamped and weighted by a factor of time at real time being the average score of location and identity for each transaction, and then reduced by a value of 1 for every minute that passes by up to an hour (60 minutes) at which point the score will be zero and not considered for calculation. The time factor of 60 minutes may be a default but can be configurable to the algorithm input parameters. In an example, if the time is smaller or larger than an hour, the system will take the duration of time and divide it into 60 increments evenly distributed over the specified time for decrementing by 1 the value, until it reaches 0, at each increment of time that passes from real-time of the transaction. The confidence score for each individual shall be combined and averaged for all non-zero scores, giving an overall scoring based on the total valid sensor data inputs.

For instance, for each unique identity sensor transaction, the following elements may be considered in the scoring algorithm for identity and location:

a. Confidence factor for identity: 0 being no confidence and 100 being guaranteed identity confirmation.

i. Voice Request for Access recognition—This score may be directly used in a percentage between 0 and 100% and would typically be in a range between 60 and 90%, but likely not 100% as an example, based on the voice recognition technology in use.
 ii. A badge swipe at a door does not provide a confidence that the actual person swiping a badge is fact the right person, so this would be a factor of 0.
 iii. A facial recognition would provide for a confidence score which would be dynamic, as the face is being read by the device. This score would be directly used in a percentage between 0 and 100% and would typically be in a score between 60 and 90%, but likely not 100% as an example.
 iv. A physical network logon using authentication can provide a high confidence of identity providing a scoring between 90 and 100%.
 v. An intrusion arm/disarm in a group assigned pin would be a low score factored on a percent based on the number of people in the group. For instance, 10 people in the group would result in a score of 10.
b. Confidence factor for location. 0 being no confidence and 100 being a guaranteed location confirmation
 i. A voice request would provide for a confidence based on the location of the device. This scoring would be 100 for the location.
 ii. A badge swipe at a door does provide a confidence that the location of swiping a badge is in fact the right location, so this would be a factor of 100.
 iii. A facial recognition would provide for a confidence based on the location of the device. This scoring would be 100 for the location.
 iv. A physical network logon due to remote tools such as TeamViewer, Remote Desktop or other remote/terminal service access may not be 100 and would be factored based on checks for remote connection software use, VPN usage or other factors that could indicate remote access. If remote tools are in use, the score may be no higher than 50 and 0 if confirmed the account for the identity is on remote connection. In a case where no detection of remote access is found, the score would be 100.
 v. An intrusion arm/disarm in a group assigned pin would be a low score factored on a percent based on the number of people in the group. For instance, 10 people in the group would result in a score of 10 as an example. An individual pin assigned to a specific user would provide a score of 100 for location based on a fixed point of the device.

An example of decisions based on these factors is described below. Thus, the present disclosure provides a security system with voice access sensor fusion functionality, which can provide additional assurance and confidence in making access control decisions as compared to prior solutions and/or voice-only-based solutions.

Referring now to FIG. 1, an example security system 100 that includes voice access sensor fusion functionality to identify one or more users 104, track locations of user devices 103, such as fobs 103-f and/or smart phones 103-s or other mobile computing devices, and enable access to restricted areas of a premise 102 based on voice information in combination with other sensor or system information associated with the user. In the example, the security system 100 is distributed between two or more locations or buildings 102. The system may also include backend components such as a system controller 118, a video analysis system 120, and an audio analysis system 122. In general, the system controller 118 might store various user information 88 for each of the users 104. Periodically, the system controller 118 may send updated user information 88 to the verification and tracking system 115 via the network 113. In response, the verification and tracking system 115 may save the received user information 88 to its verification database 114. The video analysis system 120 may analyze video data and may associate metadata to moving objects (e.g., people), numbers of moving objects, and specific users, to list a few example. The audio analysis system 122 may be configured to determine audio identification information of the users from the audio data. These components are typically located in a security control room 101 or other secure location of the building 102. Alternatively, one or more of these components could be part of a remote service network such as a cloud-based network, or "cloud," or could be part of another building associated with the security system 100.

The system 100 also includes a verification and tracking system 115 that is configured to determine which users 104 are authorized to access specified restricted areas of a building 102 and/or pass through an access point, audio sensors 105, e.g. microphones, that acquire audio data, and image sensors 107, e.g. video cameras, that acquire image data, and may further include additional components such as positioning units 110 that are configured to determine locations of the users 104 using one or more positioning techniques, and door controllers 112 that lock or unlock one or more doors or access points. These devices are usually located within and/or adjacent to the building 102 that is being protected and/or secured by the system 100. These components communicate with one another over a data network 113. The positioning units 110 are located near access points of the building 102 or areas within the buildings such as door access points that enable users 104 to physically enter or exit the building 102 or access different parts. On the other hand, the verification and tracking system 115 may typically control multiple positioning units 110. However, in some still other implementations, the verification and tracking system 115 could be integrated in the same box as the positioning unit 110.

In one or more aspects, users 104 may carry user devices 103 (e.g., fobs, smartphones, tablets, phablets, or other mobile computing devices), which broadcast packet data 105-1 to 105-n. The packet data 105 may include user information 88 for identifying an associated user. In one or more implementations, users 104 may carry access cards (badges) containing user information 88. The user information 88 may include a unique user ID 98 for each of the user devices 103. The user information 88 may further include other information for identifying the user such as, but not limited to, user voice data 99, a username/password, name of user, department, work extension, personal phone numbers, email addresses, and employee ID number, in examples. In one example, the user ID 98 includes a token or a hash of the token generated for the user 104, and a token may or may not expire after a predetermined time.

In yet another example, a rolling security identification (ID) or access code generated within the user device 103 may be used as the user ID 98. A rolling access code may be a unique authentication code for each user 104.

Users carrying the user devices 103 may enroll and/or register the user devices 103 with the system controller 118. When the user device is a fob 103-f, users may access the system controller 118 to enroll the fob via a client application of the system controller 118. When the user device is a smart phone or other mobile computing device 103-s, the users 104 may download a security app (i.e., a downloadable self-contained software application) from the app server 82 to their smart phone 103-*s*, where the security app provides access to the system controller 118.

During the enrollment/registration process, the users 104 may enter their respective user information 88 to create a user account for each user on the system controller 118. In an aspect, the user account may be created by an administrator based on the user information 88. For a fob user device 103-*f*, users provide the unique ID of the fob such as its Media Access Control (MAC) address as the user ID 98-1 of the user information 88-1. For a mobile phone (e.g. "smart phone") user device 103-*s*, users typically include the phone number of the user device 103-*s* as the user ID 98-2 of the user information 88-2. Users can additionally include other user information 88 for identifying the users such as user voice data 99 (e.g., a sample of their voice). In an aspect, during the enrollment process, the user's voice data 99 may be recorded and analyzed by the audio analysis system 122. In response, a user account is created on the system controller 118 for the user with the specified user information 88.

An administrator may add authorization information associated with each of the users 104 to the user account based on security objectives. Authorization information determines which users 104 are authorized to access specified restricted buildings or restricted areas of a building 102. In one implementation, the authorization information may be provided as a separate access control list for each door controller 112, where the authorization information includes the user information 88 of users that are authorized to access each door controller 112. In another implementation, the authorization information may be a single access control list that identifies all door controllers 112-1 through 112-*n* and the users that are authorized to access the door controllers 112-1 through 112-*n*.

When enrolling a smart phone user device 103-*s* with a token as the user ID 98, the smart phone user devices 103 and the system controller 118 may first access a token server 92 to request the token. In one implementation, the user, via the security app, may include the phone number of the user device in a request message to the token server 92. In response, the token server 92 may generate a token, and may send the token to both the system controller 118 and the user device 103 in response. The token server 92 preferably sends the token to the user device in an SMS message. The token may then be included as the user ID 98 within the user information 88 for the user, for both the user information 88 maintained for the user in the system controller 118 and the user information 88 included within the user device 103.

The wireless packet data broadcast from the user devices 103 is preferably secured to prevent unauthorized third parties from intercepting and viewing the packet data 105 during transmission (i.e. during broadcasts). In one example, the packet data 105 may be encrypted. In one example implementation, the user devices 103 may broadcast the packet data 105 using BLE (Bluetooth low energy) technology.

In an alternative implementation, the user devices 103 may be capable of broadcasting via standard Bluetooth. In still other alternative implementations, the user devices 103 may broadcast via other wireless technologies such as Wi-Fi (IEEE 802.11), active RFID (radio frequency identification), or ZigBee, to list a few examples. In an aspect, the positioning units 110 each may include two or more antennas 111. The packet data 105 may be received by antennas 111-*a*, 111-*b* of one or more positioning units 110-1 to 110-*n*, which may be located throughout the building 102. The positioning units 110-1 to 110-*n* may determine locations of the users 104 using one or more positioning techniques.

An example positioning technique may compare the relative signal strengths of the received wireless signals between two antennas 111 of the positioning unit 110. Another positioning technique may include determining time of flight or time of receipt of packet data 105 received at each of the antennas 111 of a positioning unit 110. In yet another positioning technique example, the positioning units 110 may employ triangulation between two or more positioning units 110 installed within the building. The positioning units 110 may convert the locations of the users 104 into location data 109 for each of the users. This will typically require the positioning units to share a common reference clock.

As the users 104 and their user devices 103 move through the building 102, the tracking of the user devices 103 and therefore of the users 104 is often "handed off" to other positioning units 110 in order to reduce or eliminate tracking blind spots within the building 102.

The verification and tracking system 115 may access authorization information in a verification database 114 to determine which users 104 are authorized to access specified restricted areas of a building 102 and/or pass through an access point. Once the users 104 are authenticated by the verification and tracking system 115, the verification and tracking system 115 may send a door control signal via the network 113 to the door controller 112-1, in one example. The door controller 112-1 may then enable access to a restricted area by unlocking an access point of the restricted area, such as a door, in response to determining that a calculated total confidence score (described below) of properly identifying a user meets a predefined threshold.

The door controllers 112-*n* can also be directly coupled with the positioning units 110-*n*. In this implementation, the verification and tracking system 115 may send door control signals via the network 113 to the positioning units 110-*n*, which in turn may activate their door controllers 112-*n* to enable access to the restricted areas.

The verification and tracking system 115 may access the user information 88 and authorization information within the verification database 114, which acts as a local copy or "cache" of the information. To manage the temporal relevance of the entries in the verification database 114, the verification and tracking system 115 maintains a current time, and applies a time stamp to each item of user information 88 and authorization information received from the system controller 118.

In the exemplary system 100, the image sensors 107 may record video data, which are sent via the network 113 to the video analysis system 120 to analyze and store the video data. Similarly, the audio sensors 105 may record audio data, which are sent via the network 113 to the audio analysis system 122, which may be configured to analyze and store the audio data. Typically, time and date information may be added to video/audio data to enable the data to be indexed and reviewed at a later date. This information is also known as metadata. The video analysis system 120 and audio analysis system 122 may analyze video data and audio data, respectively, and may associate metadata to moving objects (e.g., people), numbers of moving objects, and specific users, to list a few examples.

The verification and tracking system 115 may then send the location data 109 in conjunction with the audio/video data from the sensors 105, 107 to the video analysis system 120 and audio analysis system 122, respectively, for analysis. The video analysis system 120 typically analyzes the location data 109 with the video data from the image sensors 107 to verify that the user is a proper user and to identify user's location. In one example, video identification information such as facial image information that the video analysis system 120 determines from the video data may be used to confirm that the individuals possessing the user devices 103 are the proper users 104. At least in some cases, the video analysis system 120 may not be able to identify the user with the sufficient degree of accuracy. In these cases, the audio analysis performed by the audio analysis system 120 may be used to improve accuracy of user identification. This safeguards against an event such as when a user device 103 for a valid employee user 104 of a business is stolen or lost, and a different individual (e.g. other valid user 104, former employee of the business, or unauthorized user) attempts to gain access to a restricted area of the building via the user device 103. In other examples, the video analysis system 120 may analyze the tracking information provided by the location data 109 in conjunction with the video data to determine which individuals in a scene are users (holding users devices 103) and which are non-users (not holding user devices 103).

The video analysis system 120 typically combines the tracking information generated by the tracking and verification system 115 with the video data from the image sensors 107. The video analysis system 120 determines video identification information of the users from the video data. The video identification information may include, but is not limited to, facial image information and gait information of the users, and other physical characteristics that are possibly unique to the user such as clothing worn, a person's stature, and tattoos, in examples. The facial image information, in examples, may include one or more images of the user's face, or 2D or 3D vectors of facial landmarks associated with a person's facial image using facial recognition algorithms. The video identification information determined from the video data may be used to confirm that the individuals possessing the user devices 103 are the proper users.

In an aspect, the audio analysis system 122 may utilize the audio data from the audio sensors 105 to perform voice recognition. The audio analysis system 122 may be configured to determine audio identification information of the users from the audio data.

Figure 2:
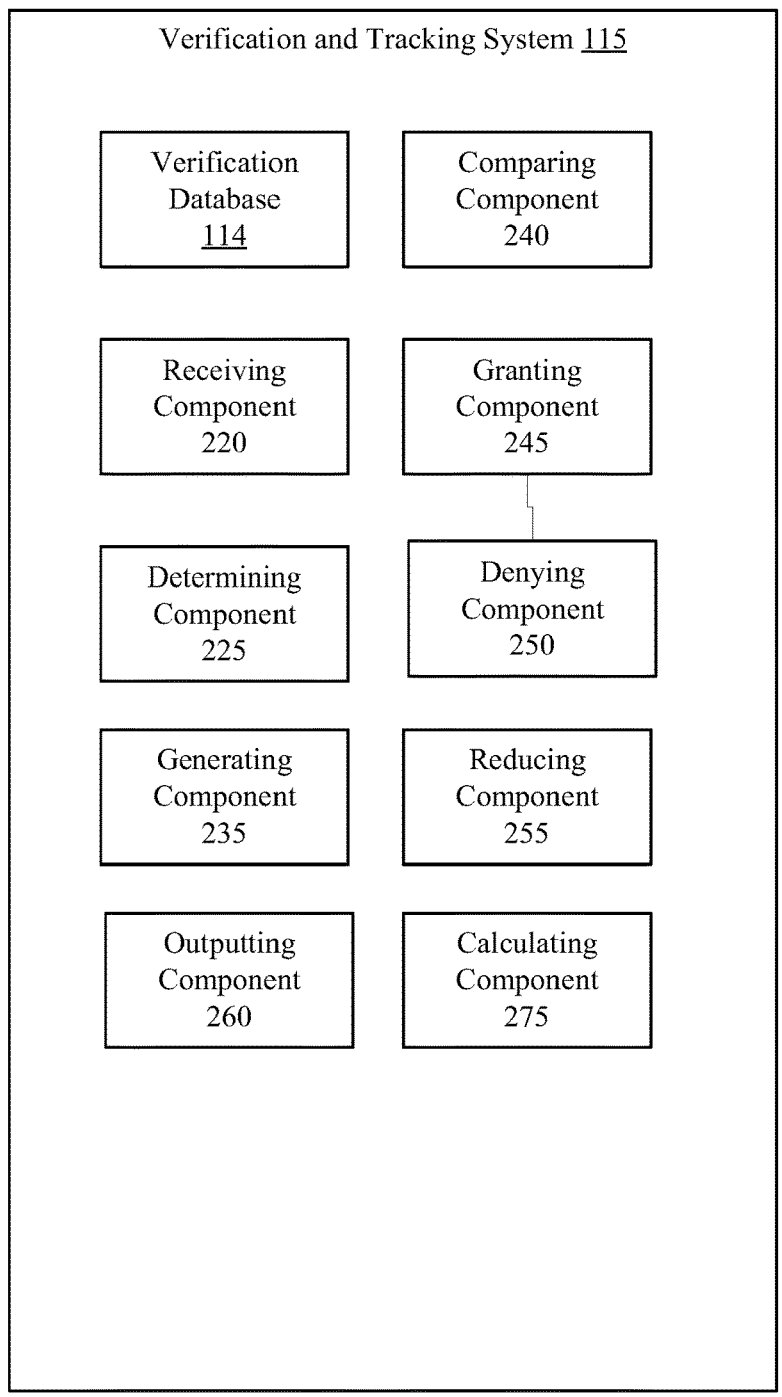
FIG. 2 is a block diagram of an example of the verification and tracking system of FIG. 1 configured to perform a method of access control.
Figure 3:
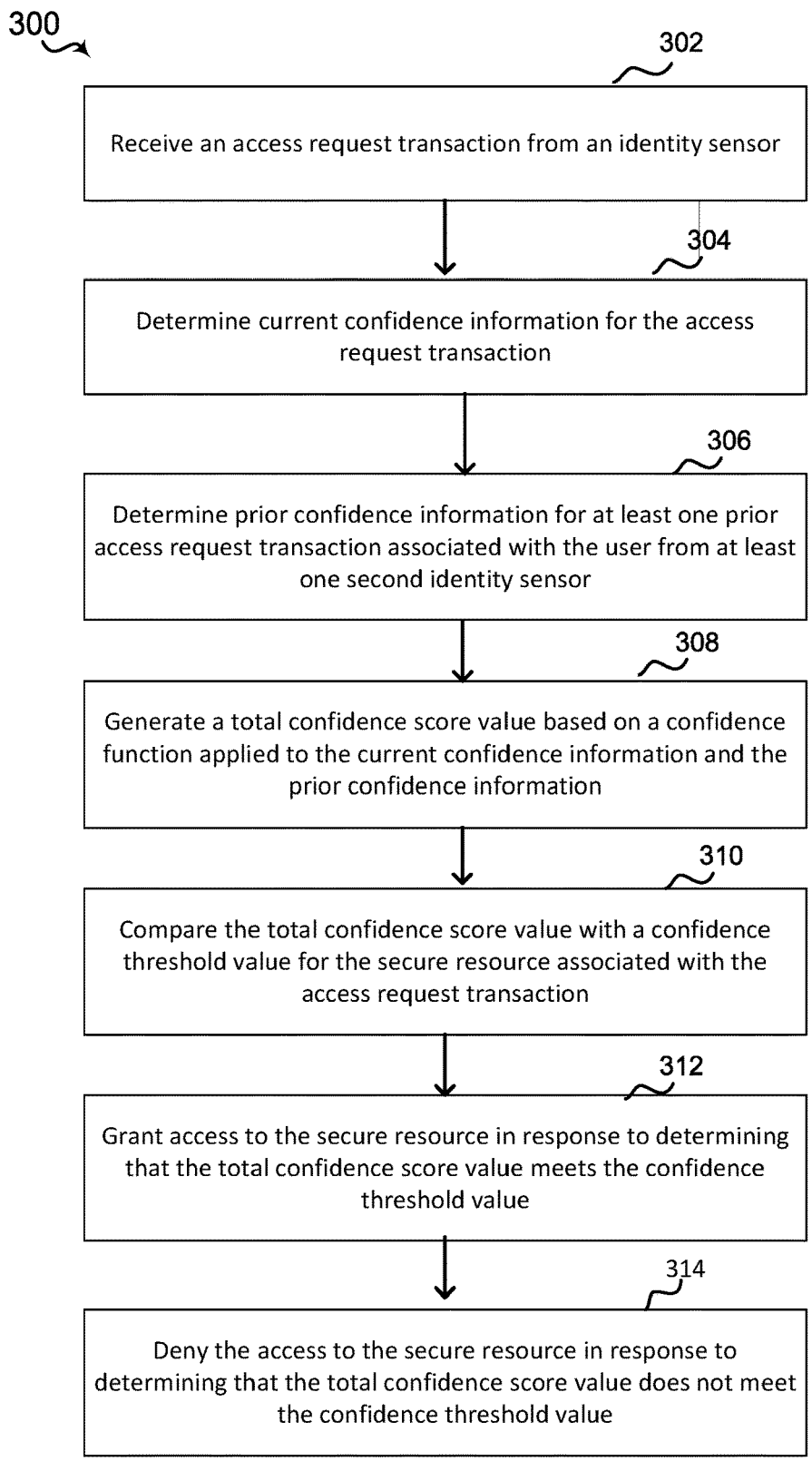
FIG. 3 is a flowchart of an example of a method of access control.

Referring to FIGS. 2 and 3, an example of the verification and tracking system 115 of FIG. 1 is configured to perform a method 300 of access control as described herein. In particular, the verification and tracking system 115 may execute a processor and/or a memory including computer-executable instructions to implement the described components to perform the described actions.

At block 302, a receiving component 220 may receive an access request transaction from an identity sensor, such as but not limited to, door controller 112, positioning unit 110, audio sensor 105, image sensor 107. The access request transaction may request access to a secure resource for a user and may include user information 88. For example, in an aspect, the user information 88 may include, video identification information, audio identification information, facial recognition information, physical network access information and the like.

At block 304, a determining component 225 may determine current confidence information for the access request transaction. The current confidence information may include a first identity confidence factor value and a first location confidence factor value. The first identity confidence factor value indicates a level of confidence in a user identity of the user. A first location confidence factor value indicates a level of confidence in a current location of the user. In other words, for each unique identity sensor transaction, the determining component 255 may use confidence factors for user identity and user location in the scoring algorithm described herein. In an aspect, a value of the first identity confidence factor may range between 0 and 100, where 0 indicates no confidence and 100 substantially guarantees user identity confirmation. Similarly, a value of the first location confidence factor may range between 0 and 100, where 0 indicates no confidence and 100 substantially guarantees user location confirmation. In an aspect, the identity confidence factor and the location confidence factor may be determined by the determining component 225 based on one or more of identity sensor transactions. The identity sensor transactions may include, but are not limited to: a voice request for access, a card (badge) swipe at the door controller 112, a facial recognition, a physical network logon, a pin value assigned to a group for arming/disarming a security system.

In an aspect, a voice request for access may be received using audio sensors 105. The determining component 225 may assign an identity confidence factor weight value ranging between 60 and 90 to the received voice request for access due to known limitations of voice recognition technology. In contrast, the determining component 225 may assign a location confidence factor weight value of 100 to the received voice request transaction if the location of the audio sensor 105 obtaining the voice request is known.

In an aspect, the determining component 225 may assign an identity confidence factor weight value of 0 to the card (badge) swipe identity sensor transaction, since this transaction does not provide a confidence that the actual person swiping a badge is in fact the right person. In an aspect, the determining component 225 may assign a location confidence factor weight value of 100 to the received card (badge) swipe transaction if the location of the door controller 112 and/or positioning unit 110 providing card access information is known.

In an aspect, the facial recognition transaction may be performed by the video analysis system 120 based on video data provided by image sensors 107. The determining component 225 may assign an identity confidence factor weight value ranging between 60 and 90 to the received facial recognition transaction due to known limitations of facial recognition technology. In aspect, the determining component 225 may assign a location confidence factor weight value of 100 to the received facial recognition transaction if the location of the image sensor 107 providing video data is known.

In an aspect, the determining component 225 may assign a high confidence of identity factor weight value ranging between 90 and 100 to the physical network logon transaction. In an aspect, the determining component 225 may assign a location confidence factor weight value based on one or more factors indicating remote access. In an aspect, such factors may include, but are not limited to, VPN usage, detected usage of remote/terminal service tools such as TeamViewer, Remote Desktop, and the like. For example, if the determining component 225 determines that remote tools are in use, it may assign a location confidence factor value no higher than 50 and may assign the location confidence factor value 0 if confirmed that the account for the identity is on remote connection. However, if the determining component 225 does not detect any indication of remote access, the determining component 225 may assign the location confidence factor value of 100 in that scenario.

In an aspect, the determining component 225 may assign an identity confidence factor weight value and a location confidence factor weight value to the received pin value assigned to a group for arming/disarming a security system based on the number of people in the group. For example, if there are 10 people in the group, the determining component 225 may assign the value of 10 to both the identity confidence factor weight value and the location confidence factor weight value.

At block 306, the determining component 225 may determine prior confidence information for at least one prior access request transaction associated with the user from at least one second identity sensor. The prior confidence information may include, for each prior access request transaction, a second identity confidence factor value that indicates the level of confidence of the user identity of the user and a second location confidence factor value that indicates the level of confidence of the location of the user. For example, in an aspect, Further, the prior confidence information may be determined by the determining component 225 similarly to current confidence information, as described above in conjunction with the block 304.

At block 308, a generating component 235 may generate a total confidence score value based on a confidence function applied to the current confidence information and the prior confidence information.

Further, for example, the confidence score for each individual may be combined and averaged for all non-zero (0) scores giving an overall scoring based on the total valid sensor data inputs.

At block 310, a comparing component 240 may compare the total confidence score value with a confidence threshold value for the secure resource associated with the access request transaction.

At block 312, a granting component 245 may grant access to the secure resource in response to determining that the total confidence score value meets the confidence threshold value.

At block 314, a denying component 250 may deny the access to the secure resource in response to determining that the total confidence score value does not meet the confidence threshold value.

In an alternative or additional aspect, the at least one prior access request transaction associated with the user includes each prior access request transaction within a time period relative to a current time.

In an alternative or additional aspect, the at least one prior access request transaction associated with the user includes each prior access request transaction having a non-zero value for at least one of the second identity confidence factor value and the second location confidence factor value.

In an alternative or additional aspect, the at least one prior access request transaction associated with the user from the at least one second identity sensor comprises a plurality of prior access requests from a plurality of different identity sensors, wherein each of the plurality of different identity sensors is associated with a sensor-specific identity factor weight used to determine the respective second identity confidence factor value and a sensor-specific location factor weight used to determine the respective second location confidence factor value.

Referring to FIG. 6, a table 600 includes an example of calculation of the confidence score and access decision made using the methods described herein. In table 600, "IT" refers to identity transaction, "VR" refers to voice request for access transaction, "BS" refers to badge swipe transaction, "FR" refers to face recognition transaction, "PNA" refers to physical network logon transaction, "IG" refers to assigned pin value transaction (either group or individual), "CR" refers to a voice challenge response (described below), "TCS" refers to total confidence score value, "DCR" refers to required confidence score to access a particular door, "DCD" refers to data center door, "LD" refers to lobby door, and "CD" refers to café door.

As shown in FIG. 6, confidence scores may be calculated by the determining component 225 for one or more users based on a plurality of identity transaction shown in the table 600. Furthermore, different doors may have different confidence score requirements for access (e.g., DCD threshold is 70, LD threshold is 55, and CD threshold is 40), which may be based on a level of security associated with the resource or area being accessed. For example, if the determining component 225 determines that first user's (e.g., "John Doe") total current confidence score value is 64 and the minimal total confidence score required to access a data center is 70, the denying component 250 may deny user's access request. However, the same user may be able to access other doors within the building protected by described security system, if other doors have the minimal total confidence score requirement that is below user's current score value. For example, the granting component 245 may grant access request to the first user having first user having the total current confidence score value of 64, if the first user requests access to either LD or CD, since the threshold for LD is 55 and the threshold for CD is 40.

As noted above, the generating component 235 may generate a total confidence score value based on a confidence function applied to the current confidence information and the prior confidence information. In an aspect, the confidence score for each individual may be combined and averaged for all non-zero (0) scores giving an overall scoring based on the total valid sensor data inputs. In the example shown in FIG. 6, the TCS (Total Confidence Score) for "John Doe" is an average of all non-zero scores. In other words, the TCS (John Doe)=(91+42+45+95+46)/5=64.

Similarly, in this example, the TCS (Jane Doe)=(81+42+50+45+67+95+70+46+100+99+99)/11=72.

Figure 4:
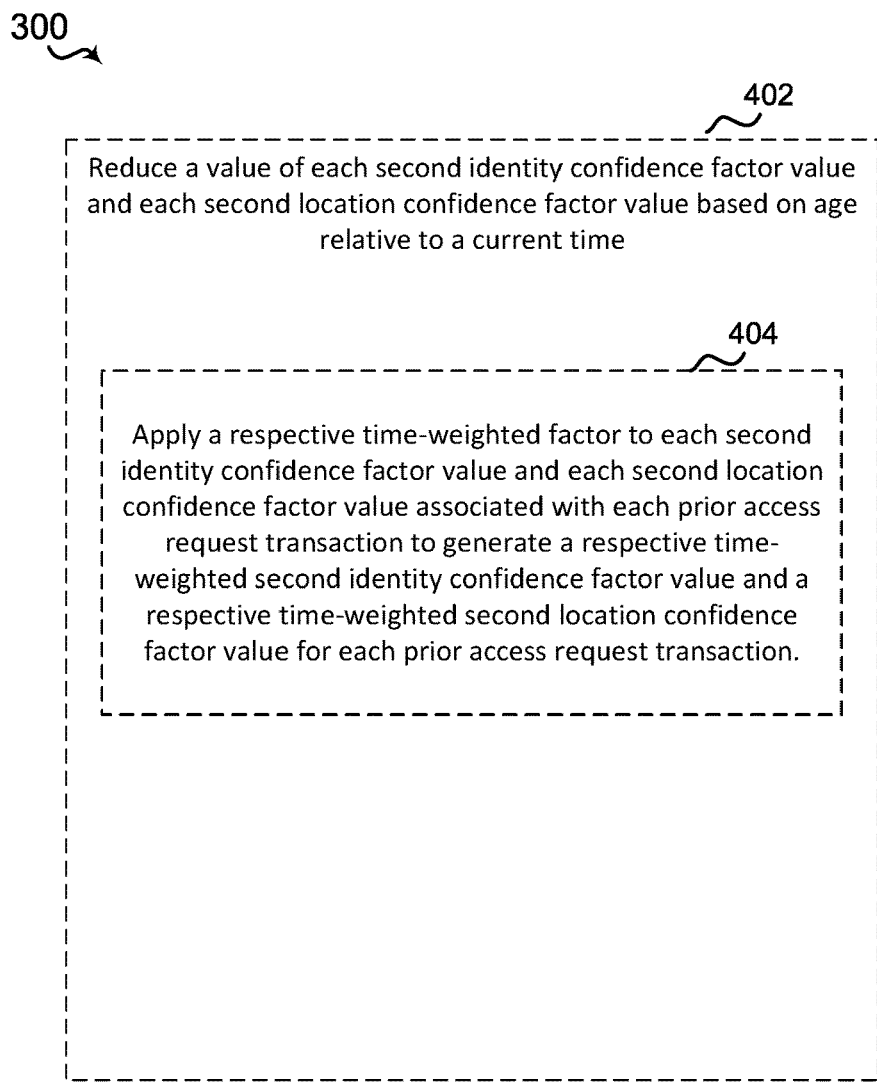
FIG. 4 is a flowchart of additional aspects of the method of FIG. 3.

Referring to FIG. 4, in an alternative or additional aspect, at block 402, a reducing component 255 may reduce a value of each second identity confidence factor value and each second location confidence factor value based on age relative to a current time.

Further, for example, the reducing at block 402 may use a default time factor of 60 minutes. In an aspect, the default time factor may be a configurable parameter of the reducing component 255. In an aspect, if the time period considered by the reducing component 255 is smaller or larger than an hour, the reducing component 255 may divide the considered time period into 60 increments evenly distributed over the specified time for decrementing the value, until it reaches 0, by 1 at each increment of time that passes from real-time of the transaction.

In this optional aspect, at block 404, the reducing at block 402 of the value of each second identity confidence factor value and each second location confidence factor value based on age may further include applying a respective time-weighted factor to each second identity confidence factor value and each second location confidence factor value associated with each prior access request transaction to generate a respective time-weighted second identity confidence factor value and a respective time-weighted second location confidence factor value for each prior access request transaction. Each respective time-weighted factor may be based on a difference between the current time and a respective transaction time of each prior access request transaction. The prior confidence information may include the respective time-weighted second identity confidence factor value and the respective time-weighted second location confidence factor value for each prior access request transaction.

For example, each identity sensor transaction (e.g. card access, intrusion arm/disarm, facial recognition, physical network access, etc.) may be time stamped and may be weighted by a factor of time at real time being the average score of location and identity for each transaction. Each time-weighted factor may be reduced by a value of 1 for every minute that pass by from the current time up to an hour at which point the time-weighted factor will be zero and not considered for calculation.

In an alternative or additional aspect, the at least one prior access request transaction associated with the user includes each prior access request transaction within a time period relative to the current time. The at least one prior access request transaction associated with the user from the at least one second identity sensor comprises a plurality of prior access requests from a plurality of different identity sensors. Each of the plurality of different identity sensors is associated with a sensor-specific identity factor weight used to determine the respective second identity confidence factor value and a sensor-specific location factor weight used to determine the respective second location confidence factor value.

In an alternative or additional aspect, the confidence threshold value for the secure resource is a resource-specific confidence threshold value.

In an alternative or additional aspect, the access request information associated with the user for the access request transaction includes voice information, and wherein prior access request information associated with the at least one prior access request transaction associated with the user includes input information different from the voice information.

In an alternative or additional aspect, the input information different from the voice information includes at least one of: access badge information, non-voice biometric information, facial recognition information, user device network access information, secure credentials of user's mobile device, beacon based tracking information, or personal identification number information.

In an alternative or additional aspect, the confidence function uses an average of values from the current confidence information and the prior confidence information.

Figure 5:
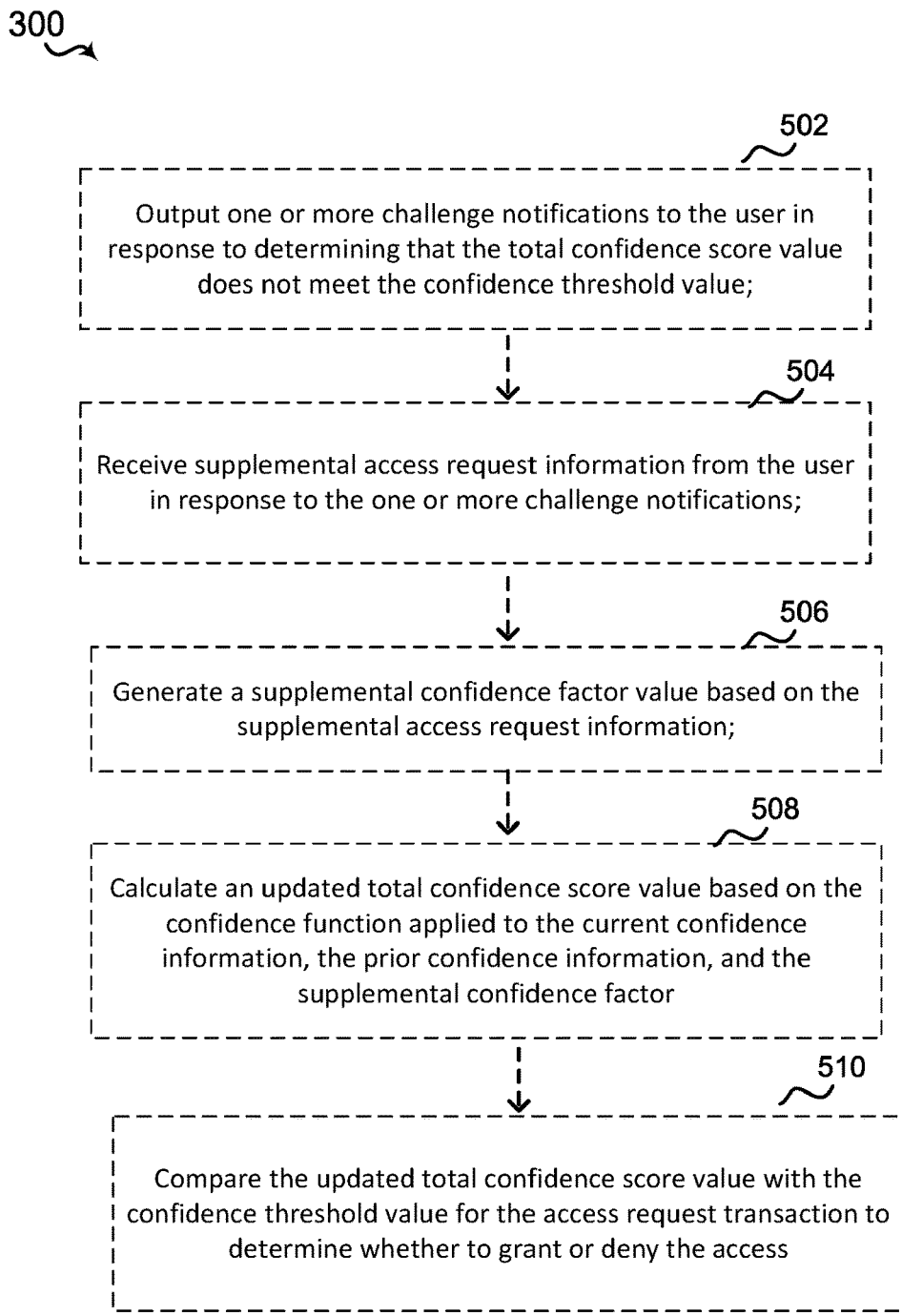
FIG. 5 is a flowchart of additional aspects of the method of FIG. 3.

Referring to FIG. 5, in an alternative or additional aspect, at block 502, an outputting component 260 may output one or more challenge notifications to the user in response to determining that the total confidence score value does not meet the confidence threshold value. For example, continuing with the example shown in FIG. 6, if the determining component 225 determines that first user's (e.g., "John Doe") total current confidence score value is 64 and the minimal total confidence score required to access a data center is 70, the outputting component 260 may output one or more challenge notifications to the John Doe. In an aspect, John Doe's request to access the data center may be either granted or denied based on the response(s) to the one or more challenge notifications.

In this optional aspect, at block 504, the receiving component 220 may receive supplemental access request information from the user in response to the one or more challenge notifications.

In this optional aspect, at block 506, the generating component 235 may generate a supplemental confidence factor value based on the supplemental access request information.

In this optional aspect, at block 508, a calculating component 275 may calculate an updated total confidence score value based on the confidence function applied to the current confidence information, the prior confidence information, and the supplemental confidence factor.

In this optional aspect, at block 510, the comparing component 240 may compare the updated total confidence score value with the confidence threshold value for the access request transaction to determine whether to grant or deny the access.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein.

Figure 7:
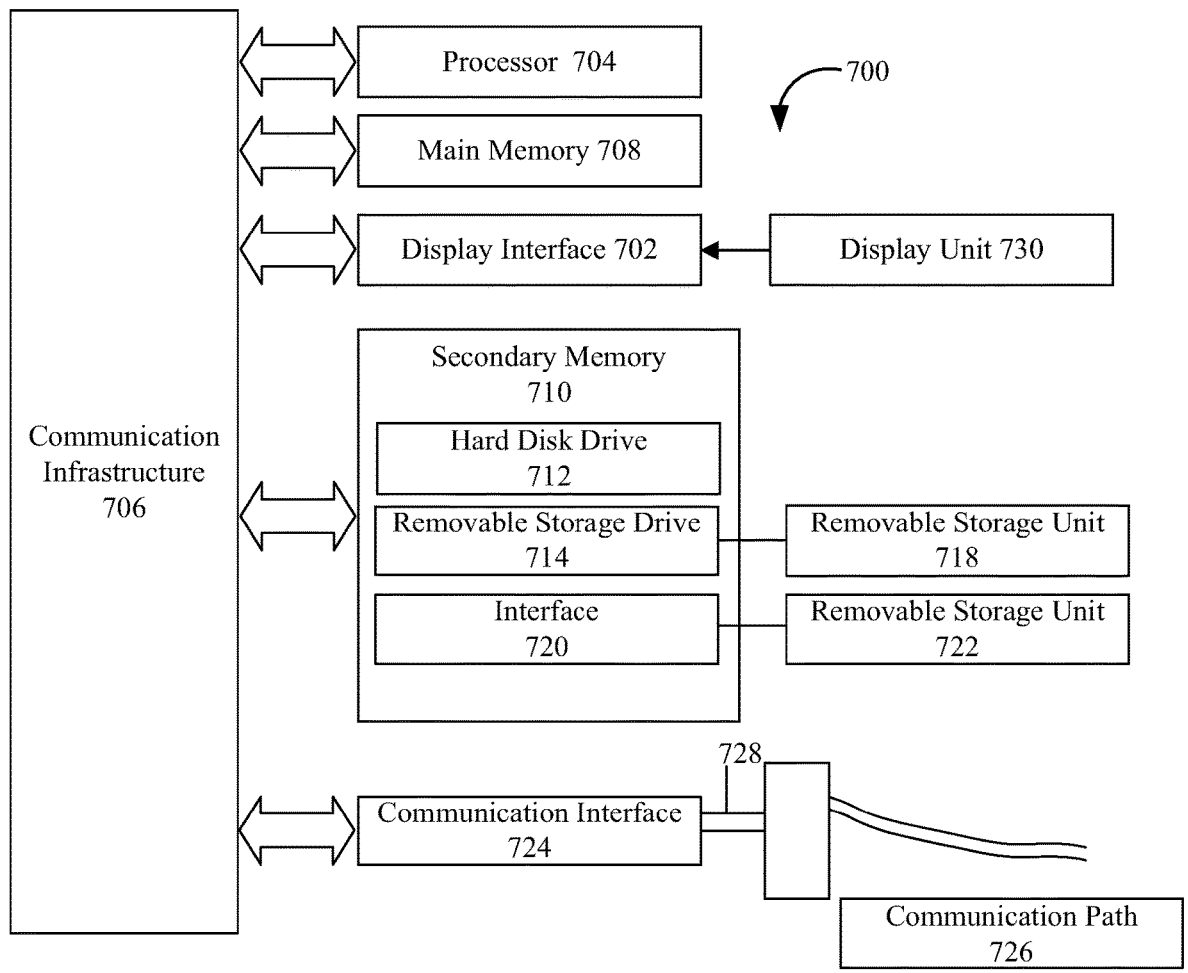
FIG. 7 is a block diagram of various hardware components and other features of an example security system in accordance with aspects of the present disclosure.

Referring to FIG. 7, an example of various hardware components and other features of a computer system may be configured to operate the security system 100 in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 700 is shown in FIG. 7.

Computer system 700 includes one or more processors, such as processor 704. The processor 704 is connected to a communication infrastructure 706 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Processor 704, or any other "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

Communication infrastructure 706, such as a bus (or any other use of "bus" herein), refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP), and RS-485 interconnect among others.

Further, the connection between components of computer system 700, or any other type of connection between computer-related components described herein may be referred to an operable connection, and may include a connection by which entities are operably connected, such that signals, physical communications, and/or logical communications may be sent and/or received. An operable connection may include a physical interface, a data interface and/or an electrical interface.

Computer system 700 may include a display interface 702 that forwards graphics, text, and other data from the communication infrastructure 706 (or from a frame buffer not shown) for display on a display unit 730. Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718, represents a floppy disk, magnetic tape, optical disk, etc., which is read by and written to removable storage drive 714. As will be appreciated, the removable storage unit 718 includes a computer usable storage medium having stored therein computer software and/or data.

In alternative aspects, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

It should be understood that a memory, as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728, which may be electronic, electromagnetic, optical or other signals capable of being received by communications interface 724. These signals 728 are provided to communications interface 724 via a communications path (e.g., channel) 726. This path 726 carries signals 728 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 714, a hard disk installed in hard disk drive 712, and signals 728. These computer program products provide software to the computer system 700. Aspects of the disclosure are directed to such computer program products.

Computer programs (also referred to as computer control logic) are stored in main memory 708 and/or secondary memory 710. Computer programs may also be received via communications interface 724. Such computer programs, when executed, enable the computer system 700 to perform various features in accordance with aspects of the present disclosure, as discussed herein. In particular, the computer programs, when executed, enable the processor 704 to perform such features. Accordingly, such computer programs represent controllers of the computer system 700.

In variations where aspects of the disclosure are implemented using software, the software may be stored in a computer program product and loaded into computer system 700 using removable storage drive 714, hard drive 712, or communications interface 720. The control logic (software), when executed by the processor 704, causes the processor 704 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of access control, comprising:
receiving an access request transaction from one of a first identity sensor, wherein the access request transaction requests access to a secure resource for a user and includes access request information associated with the user;
determining current confidence information for the access request transaction, wherein the current confidence information includes a first identity confidence factor value that indicates a level of confidence in a user identity of the user and a first location confidence factor value that indicates a level of confidence in a current location of the user;
determining prior confidence information for at least one prior access request transaction associated with the user from at least one second identity sensor, wherein the prior confidence information includes, for each prior access request transaction, a second identity confidence factor value that indicates the level of confidence of the user identity of the user and a second location confidence factor value that indicates the level of confidence of the location of the user;

generating a total confidence score value based on a confidence function applied to the current confidence information and the prior confidence information;

comparing the total confidence score value with a confidence threshold value for the secure resource associated with the access request transaction;

granting access to the secure resource in response to determining that the total confidence score value meets the confidence threshold value; and denying the access to the secure resource in response to determining that the total confidence score value does not meet the confidence threshold value.

2. The method of claim 1, wherein the at least one prior access request transaction associated with the user includes each prior access request transaction within a time period relative to a current time.

3. The method of claim 1, wherein the at least one prior access request transaction associated with the user includes each prior access request transaction having a non-zero value for at least one of the second identity confidence factor value and the second location confidence factor value.

4. The method of claim 1, wherein the at least one prior access request transaction associated with the user from the at least one second identity sensor comprises a plurality of prior access requests from a plurality of different identity sensors, wherein each of the plurality of different identity sensors is associated with a sensor-specific identity factor weight used to determine the respective second identity confidence factor value and a sensor-specific location factor weight used to determine the respective second location confidence factor value.

5. The method of claim 1, further comprising:
reducing a value of each second identity confidence factor value and each second location confidence factor value based on age relative to a current time.

6. The method of claim 5, wherein reducing the value of each second identity confidence factor value and each second location confidence factor value based on age further comprises:
applying a respective time-weighted factor to each second identity confidence factor value and each second location confidence factor value associated with each prior access request transaction to generate a respective time-weighted second identity confidence factor value and a respective time-weighted second location confidence factor value for each prior access request transaction, wherein each respective time-weighted factor is based on a difference between the current time and a respective transaction time of each prior access request transaction, and wherein the prior confidence information includes the respective time-weighted second identity confidence factor value and the respective time-weighted second location confidence factor value for each prior access request transaction.

7. The method of claim 5, wherein the at least one prior access request transaction associated with the user includes each prior access request transaction within a time period relative to the current time, and wherein the at least one prior access request transaction associated with the user from the at least one second identity sensor comprises a plurality of prior access requests from a plurality of different identity sensors, wherein each of the plurality of different identity sensors is associated with a sensor-specific identity factor weight used to determine the respective second identity confidence factor value and a sensor-specific location factor weight used to determine the respective second location confidence factor value.

8. The method of claim 1, wherein the confidence threshold value for the secure resource is a resource-specific confidence threshold value.

9. The method of claim 1, wherein the access request information associated with the user for the access request transaction includes voice information, and wherein prior access request information associated with the at least one prior access request transaction associated with the user includes input information different from the voice information.

10. The method of claim 9, wherein the input information different from the voice information includes at least one of: access badge information, non-voice biometric information, facial recognition information, user device network access information, secure credentials of user's mobile device, beacon based tracking information, or personal identification number information.

11. The method of claim 1, wherein the confidence function uses an average of values from the current confidence information and the prior confidence information.

12. The method of claim 1, further comprising:
outputting one or more challenge notifications to the user in response to determining that the total confidence score value does not meet the confidence threshold value;

receiving supplemental access request information from the user in response to the one or more challenge notifications;

generating a supplemental confidence factor value based on the supplemental access request information;

calculating an updated total confidence score value based on the confidence function applied to the current confidence information, the prior confidence information, and the supplemental confidence factor; and comparing the updated total confidence score value with the confidence threshold value for the access request transaction to determine whether to grant or deny the access.

13. An apparatus for access control, comprising:
a memory; and
a processor coupled with the memory and configured to:
receive an access request transaction from one of a first identity sensor, wherein the access request transaction requests access to a secure resource for a user and includes access request information associated with the user;

determine current confidence information for the access request transaction, wherein the current confidence information includes a first identity confidence factor value that indicates a level of confidence in a user identity of the user and a first location confidence factor value that indicates a level of confidence in a current location of the user;

determine prior confidence information for at least one prior access request transaction associated with the user from at least one second identity sensor, wherein the prior confidence information includes, for each prior access request transaction, a second identity confidence factor value that indicates the level of confidence of the user identity of the user and a second location confidence factor value that indicates the level of confidence of the location of the user;

generate a total confidence score value based on a confidence function applied to the current confidence information and the prior confidence information;

compare the total confidence score value with a confidence threshold value for the secure resource associated with the access request transaction;

grant access to the secure resource in response to determine that the total confidence score value meets the confidence threshold value; and deny the access to the secure resource in response to determine that the total confidence score value does not meet the confidence threshold value.

14. The apparatus of claim 13, wherein the at least one prior access request transaction associated with the user includes each prior access request transaction within a time period relative to a current time.

15. The apparatus of claim 13, wherein the at least one prior access request transaction associated with the user includes each prior access request transaction having a non-zero value for at least one of the second identity confidence factor value and the second location confidence factor value.

16. The apparatus of claim 13, wherein the at least one prior access request transaction associated with the user from the at least one second identity sensor comprises a plurality of prior access requests from a plurality of different identity sensors, wherein each of the plurality of different identity sensors is associated with a sensor-specific identity factor weight used to determine the respective second identity confidence factor value and a sensor-specific location factor weight used to determine the respective second location confidence factor value.

17. The apparatus of claim 13, wherein the processor is further configured to:

reduce a value of each second identity confidence factor value and each second location confidence factor value based on age relative to a current time.

18. The apparatus of claim 17, wherein to reduce the value of each second identity confidence factor value and each second location confidence factor value based on age the processor is further configured to:

apply a respective time-weighted factor to each second identity confidence factor value and each second location confidence factor value associated with each prior access request transaction to generate a respective time-weighted second identity confidence factor value and a respective time-weighted second location confidence factor value for each prior access request transaction, wherein each respective time-weighted factor is based on a difference between the current time and a respective transaction time of each prior access request transaction, and wherein the prior confidence information includes the respective time-weighted second identity confidence factor value and the respective time-weighted second location confidence factor value for each prior access request transaction.

19. The apparatus of claim 17, wherein the at least one prior access request transaction associated with the user includes each prior access request transaction within a time period relative to the current time, and wherein the at least one prior access request transaction associated with the user from the at least one second identity sensor comprises a plurality of prior access requests from a plurality of different identity sensors, wherein each of the plurality of different identity sensors is associated with a sensor-specific identity factor weight used to determine the respective second identity confidence factor value and a sensor-specific location factor weight used to determine the respective second location confidence factor value.

20. The apparatus of claim 13, wherein the confidence threshold value for the secure resource is a resource-specific confidence threshold value.

21. The apparatus of claim 13, wherein the access request information associated with the user for the access request transaction includes voice information, and wherein prior access request information associated with the at least one prior access request transaction associated with the user includes input information different from the voice information.

22. The apparatus of claim 21, wherein the input information different from the voice information includes at least one of: access badge information, non-voice biometric information, facial recognition information, user device network access information, secure credentials of user's mobile device, beacon based tracking information, or personal identification number information.

23. The apparatus of claim 13, wherein the confidence function uses an average of values from the current confidence information and the prior confidence information.

24. The apparatus of claim 13, wherein the processor is further configured to:

output one or more challenge notifications to the user in response to determine that the total confidence score value does not meet the confidence threshold value;

receive supplemental access request information from the user in response to the one or more challenge notifications;

generate a supplemental confidence factor value based on the supplemental access request information;

calculate an updated total confidence score value based on the confidence function applied to the current confidence information, the prior confidence information, and the supplemental confidence factor; and compare the updated total confidence score value with the confidence threshold value for the access request transaction to determine whether to grant or deny the access.

25. A non-transitory computer-readable medium having instructions stored thereon for access control, wherein the instructions are executable by a processor to:

receive an access request transaction from one of a first identity sensor, wherein the access request transaction requests access to a secure resource for a user and includes access request information associated with the user;

determine current confidence information for the access request transaction, wherein the current confidence information includes a first identity confidence factor value that indicates a level of confidence in a user identity of the user and a first location confidence factor value that indicates a level of confidence in a current location of the user;

determine prior confidence information for at least one prior access request transaction associated with the user from at least one second identity sensor, wherein the prior confidence information includes, for each prior access request transaction, a second identity confidence factor value that indicates the level of confidence of the user identity of the user and a second location confidence factor value that indicates the level of confidence of the location of the user;

generate a total confidence score value based on a confidence function applied to the current confidence information and the prior confidence information;

compare the total confidence score value with a confidence threshold value for the secure resource associated with the access request transaction;

grant access to the secure resource in response to determine that the total confidence score value meets the confidence threshold value; and deny the access to the secure resource in response to determine that the total confidence score value does not meet the confidence threshold value.

\* \* \* \* \*